United States Patent

Omaru et al.

[11] Patent Number: 6,146,790
[45] Date of Patent: Nov. 14, 2000

[54] NON-AQUEOUS ELECTROLYTE SECONDARY CELL

[75] Inventors: Atsuo Omaru, Kanagawa; Akira Yamaguchi; Masayuki Nagamine, both of Fukushima, all of Japan

[73] Assignee: Sony Corporation, Tokyo, Japan

[21] Appl. No.: 08/996,312

[22] Filed: Dec. 22, 1997

[30] Foreign Application Priority Data

Dec. 27, 1996 [JP] Japan ................................. 8-351104

[51] Int. Cl.[7] .................................................. H01M 10/40
[52] U.S. Cl. .......................... 429/199; 429/324; 252/62.2
[58] Field of Search .................................. 429/199, 324, 429/326, 330, 331, 332, 338, 231.8, 231.95; 252/62.2

[56] References Cited

U.S. PATENT DOCUMENTS

| | | | |
|---|---|---|---|
| 4,959,281 | 9/1990 | Nishi et al. | 429/231.8 |
| 5,395,711 | 5/1995 | Tahara et al. | 429/231.95 |
| 5,618,640 | 10/1994 | Idota et al. | 429/218.1 |
| 5,709,968 | 5/1996 | Shimizu | 429/199 |
| 5,721,071 | 9/1996 | Sonobe et al. | 429/231.8 |

FOREIGN PATENT DOCUMENTS

| | | |
|---|---|---|
| 0 347 952 A2 | 12/1989 | European Pat. Off. . |
| 0 418 514 A1 | 3/1991 | European Pat. Off. . |

OTHER PUBLICATIONS

Patent Abstracts of Japan, vol. 014, No. 502 (E–0997), Nov. 2, 1990 and JP 02 207464 A (Show a Denko KK; Others: 01), Aug. 17, 1990.
Patent Abstracts of Japan, vol. 014, No. 502 (E–0997), Nov. 2, 1990 and JP 02 207465 A (Show a Denko KK; Others: 01), Aug. 17, 1990.
Patent Abstracts of Japan, vol. 015, No. 345 (C–0864), Sep. 3, 1991 and JP 03 137010 A (Sony Corp), Jun. 11, 1991.

*Primary Examiner*—Maria Nuzzolillo
*Assistant Examiner*—Susy Tsang
*Attorney, Agent, or Firm*—Hill & Simpson

[57] ABSTRACT

In a non-aqueous electrolyte secondary cell, it is possible to control the irreversible capacity degradation which is caused when it is preserved under the condition of charging. The non-aqueous electrolyte secondary cell includes a positive electrode that is capable of doping and dedoping lithium and a negative electrode and non-aqueous electrolyte. Specifically, a monomethoxy benzene class compound is added to the non-aqueous electrolyte at a concentration ranging from 0.005 M to 0.5 M.

10 Claims, 5 Drawing Sheets

NON-AQUEOUS ELECTROLYTE SECONDARY CELL

BACKGROUND OF THE INVENTION

1. Field of the Invention

The present invention relates to a non-aqueous electrolyte secondary cell, particularly, to the improvement of a non-aqueous solvent.

2. Description of Prior Art

Small-sized and light electronic instruments have been realized by the progress of recent remarkable electronic technology. With this progress, it has been demanded to make a cell small and light and to make energy density high to the cell as a portable electric source.

Conventionally, aqueous cells including a lead, a nickel, a cadmium cell and so on are the main current of secondary cells for general use. Though these aqueous secondary cells are satisfactory in a cycle characteristic to some extent, the characteristic is not satisfactory in weight of the cell and the energy density.

On one hand, recently, a non-aqueous electrolyte secondary cell that uses lithium or lithium alloy for a negative electrode has been popularly studied and developed. This cell has high energy density by using oxide compounds including Li, such as $LiCoO_2$, as a positive electrode, and has superior characteristics of little self-discharging and light weight.

However, in the non-aqueous electrolyte secondary cell that uses Li or Li alloys for the negative electrode, with the increasing of a charging/discharging cycle, lithium proceeds up a dendrite crystal, it reaches the positive electrode and an inner short might occur. Further, as the dendrite crystal is being created, a problem arises that it is impossible to practically and rapidly charge and discharge. For this reason, it is hard to practically make the non-aqueous electrolyte secondary cell that uses Li or alloys of Li for the negative electrode.

In order to resolve these problems, the non-aqueous electrolyte secondary cell (the lithium ion secondary cell) of a so-called rocking chair type that uses layer compounds of oxides and carbons and so on, in which lithium ions are taken, for the negative material has been proposed. In such a non-aqueous electrolyte secondary cell, it is used for the reaction of the negative electrode that lithium is doped/dedoped between layers of these layer compounds. This occurs even if the charging/discharging cycle is increased, dendritic deposition is not realized and the good charging/discharging cycle is shown.

Though each kind of carbon material that can possibly be used for the negative material of the non-aqueous electrolyte secondary cell has been described, the carbon materials that have been made practical as the negative materials are graphitization retardant carbon materials, that is, low crystalline carbon materials obtained by performing thermal treatment on organic materials at comparatively low temperature. The non-aqueous electrolyte secondary cell that is formed when the negative electrode, including graphitization retardant carbon materials, is combined with an electrolyte, where propylene carbonate (PC) is the main solvent, has already been produced.

Further, recently, it has also been possible to use the kinds of graphites where crystal structure has been developed. In the case of these kinds of graphites, as PC used for the main solvent is resolved, it was a problem that the kinds of graphites are the negative electrode materials. However, the problem has been addressed by making ethylene carbonate (EC), which is very stable, as the main solvent, and it has then been possible to use them as the negative materials.

It is possible to obtain comparatively easily these kinds of scaly graphites, and they have been widely used as conductive agents for alkali cells and so on as usual. These kinds of graphites are highly crystalline and have high actual density compared to graphitization retardant carbon materials. Therefore, if the negative electrode is formed with these kinds of graphites, it is possible to obtain a high electrode charging characteristic and the energy density of the cell is advanced. Therefore, these kinds of graphites are the materials which are largely expected as the negative electrode material.

OBJECT AND SUMMARY OF THE INVENTION

In a lithium ion secondary cell, the following potential state is caused by charging. That is, as a positive material, oxide compounds including Li, such as $LiCoO_2$, which is representative as above mentioned are used. In oxide compounds including Li, Li ions are taken out in charging and the potential becomes the high potential of about 4.2 V. On one hand, in the carbon material of the negative electrode material, the Li ions are doped and the potential approaches the potential of Li metal.

Therefore, in this cell, a positive electrode is very easily oxidized and a negative electrode is very easily reduced. When the cell is preserved under the condition of charging, some irreversible reaction occurs in the electrodes during charging, and there is a problem that capacity degradation, which is not recovered, is caused.

The present invention is proposed based on considerations of the conventional situation. An object of the present invention is to provide a non-aqueous electrolyte secondary cell where it is possible to control the irreversible capacity degradation, which is caused when the cell is preserved during charging.

The inventors of the present invention earnestly examined in order to achieve the object as above mentioned. As a result, we knew that it is possible to control the capacity degradation due to the irreversible reaction caused when the cell is preserved during charging. Specifically, the inventors discovered that the capacity degradation can be controlled by adding monomethoxy benzene class compounds of specific condensation to an electrolyte.

The non-aqueous electrolyte secondary cell according to the present invention has been completed based on such knowledge, and the non-aqueous electrolyte secondary cell is characterized by having a negative electrode capable of doping/dedoping lithium, a positive electrode and a non-aqueous electrolyte. The electrolyte is dissolved in a non-aqueous solvent where one of at least monomethoxy benzene or monomethoxy benzene class compounds, represented by Chemical Formulas 1, 2, and 3 below, are added to the non-aqueous electrolyte at condensation levels ranging from 0.005 to 0.9 M.

[Chemical Formula 1]

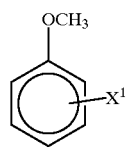

(Where, $X^1$ is a halogen element.)

[Chemical Formula 2]

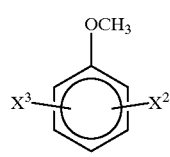

(Where, $X^2$ and $X^3$ are halogen elements.)

[Chemical Formula 3]

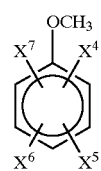

(Where, $X^4$, $X^5$, $X^6$ and $X^7$ are halogen elements.)

In the non-aqueous electrolyte secondary cell, the positive electrode is more than 4V during charging; it possesses the high potential. The negative electrode approaches to a lithium cell and both of them are under the condition of occurring irreversible reaction.

Then, when monomethoxy benzene or the monomethoxy benzene class compounds into which halogen elements are introduced are added to the non-aqueous electrolyte, the irreversible reaction of the positive and the negative electrode is controlled and the capacity degradation is prevented.

DETAILED DESCRIPTION OF THE INVENTION

Figure 1:
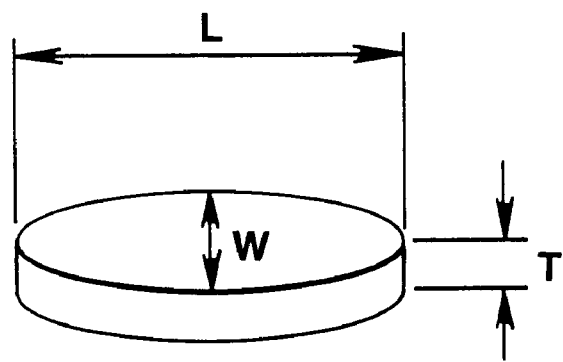
FIG. 1 is a schematic view showing an example of a form of a particle of graphite.

Specific embodiments of the present invention will now be described.

A non-aqueous electrolyte secondary cell according to the present invention includes a positive electrode capable of doping/dedoping lithium, a negative electrode and a non-aqueous electrolyte. The electrolyte is dissolved in a non-aqueous solvent.

Pursuant to the present invention, monomethoxy benzene, as represented by Chemical Formula 4, or the monomethoxy benzene class compounds into which halogen elements are introduced, as represented by Chemical Formulas 1, 2 and 3, are added to the non-aqueous electrolyte of the non-aqueous electrolyte secondary cell.

[Chemical Formula 4]

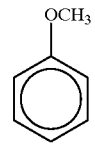

[Chemical Formula 1]

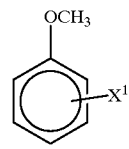

(Where, $X^1$ is a halogen element.)

[Chemical Formula 2]

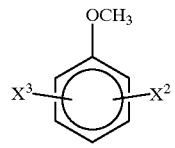

(Where, $X^2$ and $X^3$ are halogen elements.)

[Chemical Formula 3]

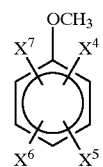

(Where, $X^4$, $X^5$, $X^6$ and $X^7$ are halogen elements.)

When the monomethoxy benzene class compounds as above mentioned are added to the non-aqueous electrolyte, irreversible reactions of the positive and the negative electrode, which are caused when preserving during charging, are controlled and the capacity degradation, which is not recovered, is prevented.

In this additive, it is important that the number of methoxy groups introduced into a benzene ring is one. When more than two methoxy groups are introduced into the benzene ring, the molecule becomes large and the advantageous characteristic of the electrolyte, such as ion conductivity, is spoiled. Further, the effectiveness for controlling capacity degradation is not enough.

In the monomethoxy benzene class compounds represented by Chemical Formulas 1, 2 and 3, halogen elements X are Cl, Br, F and so on; where F is the most preferable of them and Br is the next preferable. Positions into which halogen elements X are introduced are not particulary limited.

Further, only one monomethoxy benzene class compound and combination of plural kinds of monomethoxy benzene class compounds may be used.

Though proper addition of the monomethoxy benzene class compounds depend on the kinds of compounds, it preferably ranges from 0.005 to 0.5 M, more preferably, from 0.005 to 0.9 M. When the addition is too small, it is impossible to sufficiently obtain the effectiveness for controlling the capacity degradation. Further, when the addition is too large, conductivity of the electrolyte drops and, particulary, the characteristic at low temperature is spoiled.

Though the monomethoxy benzene class compounds are added to the electrolyte according to the present invention, it is possible to use any other compositions of the electrolyte that are usually used in this kind of non-aqueous electrolyte secondary cell.

As the non-aqueous solvent, it is preferable to use a solvent, such as ethylene carbonate, where permitivity is comparatively high, as the main solvent and then add plural solvents of low viscosity.

As the high permitivity solvents, it is possible to use propylene carbonate (PC), butylene carbonate (BC), vinylene carbonate (VC), sulfolalanate, butyrolactonate, valerolactonate and so on, as well as ethylene carbonate (EC).

As the low viscosity solvents, it is possible to use symmetrical chain carbonic esters, including diethyl carbonate and dimethyl carbonate and so on, asymmetrical chain carbonic esters, including methyl ethyl carbonate, methyl propyl carbonate and so on, carboxylic esters, including methyl propionate, ethyl propionate and so on, and phosphoric esters, including trimethyl phosphate, triethyl phosphate and so on. Only one kind or combinations of more than two kinds of them may be used.

However, in the case of using the graphite material as the negative electrode, it is preferable to use ethylene carbonate or a compound that a hydrogen atom of ethylene carbonate is substituted by halogen as the main solvent.

Even if a solvent is reactive to graphite, such as propylene carbonate, it is possible to use the solvent so long as ethylene carbonate or an halide of ethylene carbonate is the main solvent. Such solvents are added as second component solvents. The compound of monomethoxy benzene class compounds are added to the electrolyte, and it acts to control reaction between the graphite material and the solvent. Therefore, it is possible to add comparatively more of propylene carbonate.

As the second component solvents, it is preferable to use buthylene carbonate, vinylene carbonate, 1,2-dimethoxy ethane, 1,2-dimethoxy methane, γ-butyrolacton, valelactone, tetrahydrofuran, 2-methyltetrahydrofuran, 1,3-dioxyfran, 4-methyl-1,3-dioxolan, sulforan, methylsulforan and so on as well as propylene carbonate. It is also preferable to use the carbonic ester class solvents of propylene carbonate, buthylene carbonate, vinylene carbonate and so on. It is preferable that the addition of them is from 20 to 40 vol %.

As electrolyte salts, which are dissolved in the non-aqueous solvents, it is possible to use any conventional salts that are used for this kind of cell. Specifically, by way of example, $LiPF_6$, $LiClO_4$, $LiAsF_6$, $LiBF_4$, $LiB(C_6H_5)_4$, $CH_3SO_3Li$, $CF_3SO_3Li$, $LiN(CF_3SO_2)_2$, $LiC(CF_3SO_2)_3$, LiCl, LiBr and so on are given as examples. It is possible to use only a kind of these salts or plural kinds of these salts. In the case of using them in combination, it is preferable that $LiPF_6$ is the main component.

On one hand, it is possible to use the following components as the negative and the positive electrode of the cell.

First, as the negative electrode materials, carbon materials are used that are capable of doping and dedoping lithium ions and crystalline or non-crystalline metallic chalcogenized compounds are used. For the carbon material, it is preferable to use a non-graphitizable carbon material or graphite material.

As the non-graphitizable carbon material, the material having material parameters that the (002) surface interval is more than 0.37 nm, the actual density is less than 1.70 g/cm$^3$ and an exothermic peak is not higher than 700° C. in the differential thermal analysis (DTA) in a current of air is preferable.

The non-graphitizable carbon material, as above mentioned, is obtained by performing heat treatment at the temperature of 1000° C. on an organic material.

As representative of original materials, the homopolymer and the copolymer of furfuryl alcohol and furfural, or furan resin copolymerized with other resin and so on are given.

Further, it is possible to use conjugated phenol resin, acrylic resin, vinyl resin halide, polyimide resin, polyamideimide resin, polyamide resin, polyacetylene, conjugated system resin of poly (p-phenylene) and so on, cellulose, derivative of the cellulose, and arbitrary organic high molecular compounds.

A functional group, including oxygen, is introduced (a so-called oxygen bridge) into an oil pitch having the specific H/C atomic ratio. Similar to the furan resin as above mentioned, it is not melted in the process for carbonizing (higher than 400° C.) and finally becomes the non-graphitizable carbon material at the solid phase state.

The oil pitch is obtained by processes of distillation (vacuum, atmospheric and steam distillation), thermal polymerization/condensation, extraction, chemical polymerization/condensation and so on from kinds of tar. The tar is obtained by high temperature thermal decomposition of coal tar, ethylene bottom oil, crude oil, asphalt and so on. Then, the H/C atomic ratio of the oil pitch is important, and it is necessary that the H/C atomic ratio is from 0.6 to 0.8 for making the non-graphitizable carbon material.

Though specific means for forming the oxygen bridge to these pitches are not limited, for example, the wet process by aqueous solutions, such as nitric acid, mixed acid, sulfuric acid and bypochlorous acid, or the dry process by oxidizing gas (air, oxygen), further, reaction by solid reagents, such as sulfur, ammonium nitrate, ammonia persulfurate and iron chloid (II), are used.

Though this content rate of oxygen is not limited, as disclosed in Japanese Patent Laid-Open No. 3-252053, more than 3% is preferable and more than 5% is more preferable. This content rate of oxygen has an effect on the structure of the carbon material finally produced. When the content rate of oxygen is within this range, it has the material parameters that the (002) surface interval, as above mentioned, is longer than 0.37 nm and there is no exothermic peak higher than 700° C. in the differential thermal analysis (DTA) in a current of air. Therefore, the capacity of the negative electrode is advanced.

The original raw materials are not limited to the above-described materials. It is possible to use any other organic materials, that is, any materials that become the non-graphitizable carbon material through the solid phase carbonizing process by the oxygen bridge treatment and so on.

Further, not only can the non-graphitizable carbon material that the organic materials as above mentioned are original raw materials be used, the compounds where phosphorus, oxygen and carbon are the main components, as disclosed in Japanese Patent Laid-Open No. 3-137010, show the same material parameters as those of the non-graphitizable carbon material. Such compounds are preferable as the material of the negative electrode.

Though the non-graphitizable carbon material is obtained by carbonizing (i.e. by burning the organic material as above mentioned and so on), it is preferable to burn according to the following process.

That is, in order to compose the non-graphitizable carbon material, after carbonizing the organic raw material at the temperature from 300° C. to 700° C., burning is executed under the conditions that temperature is raised from 1° C. to 100° C. per minute, arrival temperature is from 900° C. to 1300° C. and retention time at the arrival temperature is from 0 to 300 hours. The carbonizing process may be omitted depending on the case. Though a sintered body obtained as above mentioned, after that, is ground, classified and provided to the negative electrode, the grinding may be executed before or after carbonization, calcination and thermal treatment at high temperature, and during the temperature increasing process.

Next, as the graphite material, it is preferable that the actual density is more than 2.1 g/cm$^3$, more preferable, more than 2.18 g/cm$^3$. In order to obtain such actual density, the (002) surface interval measured by the X-ray diffraction method is preferably less than 0.340 nm, more preferably, 0.335 nm and less than 0.337 nm. It is necessary that thickness of C axis crystallite of the (002) surface is more than 14.0 nm.

Further, in the graphite material, characteristics, such as volume density, mean form parameter x ave, specific surface area, distribution of degrees of grains and destructive strength of particle as well as the actual density and the parameters of the structure of crystals, are important. These characteristics will be described as follows.

First, the volume density is measured according to the method described in JIS K-1469. The measuring method will be described as follows.

Method for Measuring Volume Density

Incline a graduated measuring cylinder, the mass of which has been previously measured and the volume of which is 100 cm$^3$, and gradually enter sample powders of 100 cm$^3$ into it by using a spoon. Measure the whole mass by 0.1 g of the minimum scale and find the mass M of the sample powders by subtracting the mass of the graduated measuring cylinder from the mass of it.

Next, cork the graduated measuring cylinder into which the sample powders are entered, and drop the graduated measuring cylinder from the height of about 5 cm to a rubber plate 50 times. As a result, as the sample powders in the graduated measuring cylinder are compressed, read the volume V of the compressed sample powders. Calculate volume specific gravity (g/cm$^3$) by the following expression 1:

$$D=M/V$$

where
D: Volume Specific Gravity (g/cm$^3$)
M: Mass (g) of sample powders in a graduated measuring cylinder
V: Volume of sample powders in a graduated measuring cylinder after dropping 50 times.

It is preferable that a graphite material, having a volume density of more than 0.4 g/cm$^3$, be used. As the form of the graphite is scaly-like, it is easy to come off and it causes a shortened cycle life. However, if the volume density of the graphite material is more than 0.4 g/cm$^3$, it is possible to lose control and for the cycle life to be extended. The preferable range of the volume density is more than 0.5 g/cm$^3$, and more preferably, more than 0.6 g/cm$^3$.

Next, the mean form parameter x ave is found as follows.

Mean Form Parameter x ave: SEM Method

Figure 2:
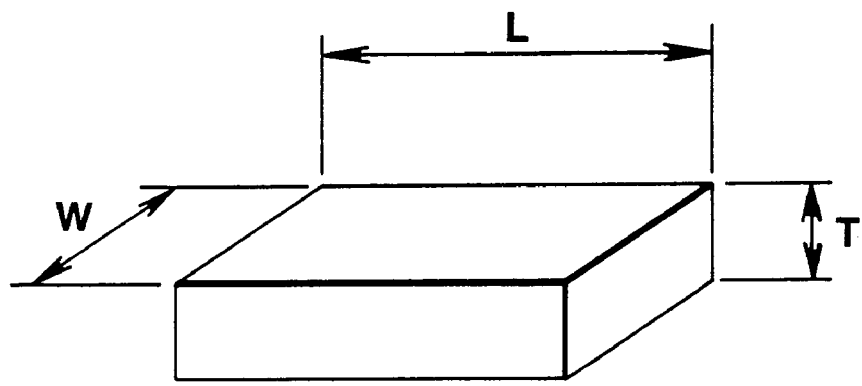
FIG. 2 is a schematic view showing another example of a form of a particle of graphite.

The representative particle form of the graphite material is a flat column or a rectangular parallelepiped, as shown in a schematic view in FIG. 1 or 2. When the thickness of the thinnest part of the particle of the graphite is T, the longest length in the direction of a major axis is L and the length in the direction at right angles to the major axis corresponding to depth is W, the product of the values where L and W are divided by T, respectively, is the form parameter x as above mentioned. (See Expression 2 below.) The smaller the form parameter x is, the higher the height to a bottom area is and the smaller the degree of flattening is.

$$x=(L/T)\times(W/T) \qquad \text{(Expression 2)}$$

where
x: Form Parameter
T: Thickness of the thinnest part of powder
L: Length in the direction of a major axis of the powder
W: Length in the direction at right angle to the major axis of the powder.

In order to measure the form parameter x about the actual graphite powder, observe the form of the graphite powder by using SEM (a scanning type electronic microscope), and choose ten grains where the length of the longest part is ±30% of the mean grain size. Calculate the form parameters of the ten chosen grains by using Expression 2, respectively, and the mean of them. The calculated mean value is the mean form parameter x ave.

It is preferable that the mean form parameter x ave is less than 125. Using the graphite powder of low degree of flattening where the mean form parameter x ave is less than 125, the structure of the electrode is advanced, and it is hard for the graphite powder to come off. Therefore, the cycle life is extended. The preferable range of the mean form parameter x ave is from 2 to 115, more preferably, from 2 to 100.

Next, the specific surface area of the graphite powder is found by the nitrogen absorbing BET method, and is preferably less than 9 m$^2$/g. The cycle life of the cell is further improved when the volume density and the mean form parameter x ave satisfy the condition as above mentioned and by using the graphite powder having a specific surface area of less than 9 m$^2$/g.

Controlling the specific surface area has an effect on the cycle life of the cell because the specific surface area corresponds to adhesion of a corpuscle to the graphite powder.

Namely, there are many cases where the corpuscles order of sizes, of which is approximately sub micron, are adhered to the graphite powder; therefore, it is considered that adhesion of the corpuscles causes low volume density of the graphite material. Therefore, it is preferable that the adhesion of the corpuscles to the graphite powder is as few as possible.

On one hand, if degree of grain is the same, the more the corpuscles adhere, the larger is the specific surface area of the graphite powder. On the contrary, the less the corpuscles adhere, the smaller is the specific surface area of the graphite powder. That is, that the specific surface area is controlled to less than 9 $m^2/g$ means that the adhesion of the corpuscles is very few, therefore, the high volume density and the long cycle life is obtained. The specific surface area is preferably less than 7 $m^2/g$, more preferably, less than 5 $m^2/g$.

The degrees of grains of the graphite powder is optimized by accumulation of 10 grain size %, accumulation 50 grain size %, and accumulation 90 grain size % found by the distribution view of the degrees of grains. The accumulation 10 grain size %, the accumulation 50 grain size %, and the accumulation 90 grain size % mean the grain sizes when the area integrated from 0 $\mu$m becomes 10%, 50% and 90% of the whole area in the distribution view of the degrees of grains.

It is preferable that the accumulation 10 grain size % is larger than 3 $\mu$m, the accumulation 50 grain size % is larger than 10 $\mu$m, and the accumulation 90 grain size % is larger than 70 $\mu$m for the following reason.

That is, in the case of considering electrode filling characteristic, the distribution of degrees of grains of the graphite powder is the distribution that is wide in the direction of the horizontal axis (the grain size), particularly, it is possible to obtain high filling efficiency when the distribution is the normal distribution, and it is preferable.

However, heat might be generated in the cell in case of an abnormal situation such as overcharging and so on. When the distribution volume of the graphite powder including the small sized grains is large in this case, the heat generating temperature tends to be high.

On one hand, as lithium ions are inserted into the graphite layers in charging the cell, the crystallite is expanded by about 10%. The positive electrode and a separator are compressed by this expansion, and trouble at the beginning, such as an inner short, easily occurs in charging at the first time. The larger the distribution volume of the graphite powder, including large sized grains, the more pronounced are the adverse effects from such expansion.

That is, in the graphite powder, even if there are too many small sized grains or even if there are too many large sized grains, it is inconvenient and it is preferable that the small to the large sized grains are proportionally combined.

The ranges of the accumulation 10, 50 and 90 grain size % as above mentioned are set by considering these points, and the graphite powder satisfying this are proportionally combined from the small to the large sized grains. Therefore, as the heat generated in the cell in overcharging and so on is controlled, the adverse effects at the beginning are reduced and high reliability is secured. The accumulation of 90 grain size % of them is preferably less than 60 $\mu$m from a viewpoint of preventing the adverse effects at the beginning.

It is possible to measure the grain sizes and the number of grains, for example, by diffusion of laser beams. Specifically, measurement is accomplished by using a micro track grain size analyzer.

Next, destructive strength of the graphite powder is measured as follows.

Method for Measuring Mean Grain Destructive Strength

Measuring of destructive strength is executed by using a Shimazu Minute Compression Test Apparatus (made by Shimazu Seisakusho Co., Ltd. under the product name of MCTM-500).

First, observe the graphite powder by an additional optical microscope, and choose 10 grains where the length of the longest part is from ±10% of the mean grain size. Multiply the load to 10 chosen grains respectively, measure the destructive strength and calculate the mean value of them. The calculated mean value is the mean grain destructive strength of the graphite powder.

In order to obtain sufficient heavy loading characteristic as a practically used cell, it is preferable that the mean grain destructive strength of the graphite powder is more than 6.0 $kgf/mm^2$. There is the following relation between the destructive strength and the loading characteristic.

First, the loading characteristic depends on easiness of moving ions in discharging.

Here, when there are a lot of holes in the electrode material, electrolyte is easy to impregnate into the electrode. Therefore, the ions are easily moved and it is possible to obtain the good loading characteristic. As the ions are hard to move when there are few holes in the electrode material, the loading characteristic is inferior.

On one hand, in the high crystalline graphite material, hexagonal net surfaces of the graphite are developed in the direction of the crystal along the a axis, and crystallites in the direction of the C axis are formed by accumulation of them. Combination of hexagonal net surfaces of carbon is the weak combination named van der Waals force and it is easy to deform by stress. Therefore, the graphite material is easily crushed in filling it into the electrode by compression molding and it is hard to secure the holes.

The destructive strength as above mentioned is an index where the holes are hard to crush. If the graphite material where the destructive strength is more than 6.0 $kg/mm^2$ is chosen, the holes are secured and it is possible to achieve good loading characteristic.

Though the graphite material having property of matter as above mentioned is chosen and used, this graphite material may be both the natural graphite and the artificial graphite which is obtained by carbonizing the organic material and treating at high temperature.

In producing the artificial graphite, coal and pitch are representative as the organic material which is the original material.

Some pitch is obtained by distilling (vacuum distillation, atmospheric distillation, and steam distillation), thermally polymerizing/condensing, extracting, chemically polymerizing/condensing and so on coal tar, ethylene bottom oil, kinds of tar obtained by thermally decomposing crude oil and so on at high temperature and asphalt and so on, and other is obtained in making reflux of lumber.

Further, as the original materials for the pitch, there are polyvinyl chloride resin, polyvinyl acetate, polyvinyl butylate, 3,5-dimethyl phenol resin and so on.

The coal and pitch are liquid at the maximum temperature of about 400° C. during carbonizing. By maintaining at this temperature, aromatic rings are condensed with each other, made polycyclic, accumulated and oriented, then, at the temperature higher than about 500° C., a precursor of solid carbon, that is, semicoke is made. Such process is called the liquid phase carbonizing process and is a representative producing process for easily graphitizing carbon.

Further, it is also possible to use condensed polycyclic hydrocarbon compounds of naphtalene, phenanthrene, anthracene, triphenylene, pyrene, perylene, tenthaphene, pentacene and so on, other derivatives (for example, carboxylic acid, carboxylic anhydride, carboxylic imide and so on of them), or a mixture, condensed heterocyclic compounds of acenaphthylene, indole, isoindole, quinoline, isoquinoline, quinoxaline, phthaladine, carbazole, acrizine, phenazine, phenatholyzine and so on, and derivatives of them as raw materials.

In order to make the artificial graphite, the organic materials as above mentioned are used as the original materials. For example, the organic materials as above mentioned are carbonized in a current of an inert gas, such as nitrogen, at the temperature from 300° C. to 700° C. After that, the organic materials are calcined under the conditions that the temperature is raised from 1° C. to 100° C. per minute, arrival temperature is from 900° C. to 1500° C., and maintaining time at the arrival temperature is 0 to 30 hours in the current of inert gas. Further, they are thermally treated at the temperature higher than 2000° C., more preferably, 2500° C. Carbonization and calcination may be omitted depending on the circumstances.

Though the graphite material made as above mentioned is classified, or crushed/classified, and provided to the negative electrode material, crushing may be executed before or after carbonizing and calcining, or during the temperature up process before graphitizing. In these cases, thermal treatment is executed for graphitizing under the condition of the powder.

However, in order to obtain the high graphite powder volume density and destructive strength, it is preferable to mold the raw material and execute thermal treatment, and crush and classify the obtained graphitized molded body for black lead.

That is, in order to made the graphitized molded body, molding is executed by mixing coke which is filler and binder pitch which is molding agent or sintering agent. After performing the thermal treatment on the molded body at the low temperature of less than 1000° C., the pitch impregnation/sintering process to impregnate the melted binder pitch is repeated several times. Then, the thermal treatment is performed at the high temperature. The impregnated binder pitch is carbonized at the thermal treatment process as above mentioned and is graphitized. The obtained graphitized molded body is crushed for the graphite powder.

In the crushed powder of the graphitized molded body obtained as above mentioned, the volume density and the destructive strength is high, and it is possible to obtain the high quality electrode.

Further, as filler (coke) and the binder pitch is used for the raw materials, graphitizing is executed as many crystalline, sulfur and nitrogen, which are included in the raw materials, release as gas during the thermal treatment, therefore, micro holes are formed on its way. When the holes are formed, reaction of the negative electrode occurs, that is, it is easy to progress the doping and dedoping reaction. Further, when there are the holes, there is also an advantage that treatment efficiency is industrially high.

Further, as raw material of the mold body, the filler having molding and sintering property may be used. In this case, it is not necessary to use the binder pitch.

As the negative electrode material, it is possible to use metal oxide that is capable of doping and dedoping lithium ions as well as the carbon material.

As the metal oxide, an oxide including a transition metal is preferred, and specifically ion oxide, ruthenium oxide, molybdenum oxide, tungsten oxide, titanium oxide, tin oxide, crystalline compounds, non-crystalline compounds are given as preferred examples. It is preferable to use things where the charging/discharging potential is approximately that of metal Li.

Next, the material of the positive electrode will be described.

It is preferable that the material of the positive electrode includes sufficient amount of Li. For example, compounds of metal oxide including Lithium and transition metals shown by, for example, a general chemical formula $LiMO_2$ (however, M means at least one of Co, Ni, Mn, Fe, Al, V and Ti) and layer phase compounds including Li and so on.

Particularly, in order to achieve high capacity, the positive electrode includes Li corresponding to the charged and discharged capacity of more than 250 mAh per the carbon material 1 g at the stationary state (for example, after repeating to charge and discharge about five times). It is preferable to include Li corresponding to the charged and discharged capacity of more than 300 mAh.

Li is not always supplied all from the positive electrode, that is, Li corresponding to the charged and discharged capacity of more than 250 mAh per the carbon material 1 g may be in the cell system. Amount of Li in the cell system is judged by measuring the discharged capacity of the cell.

EXAMPLES

Embodiments of the present invention will be described according to the results of experiments.

Structure of Cell Made

Figure 3:
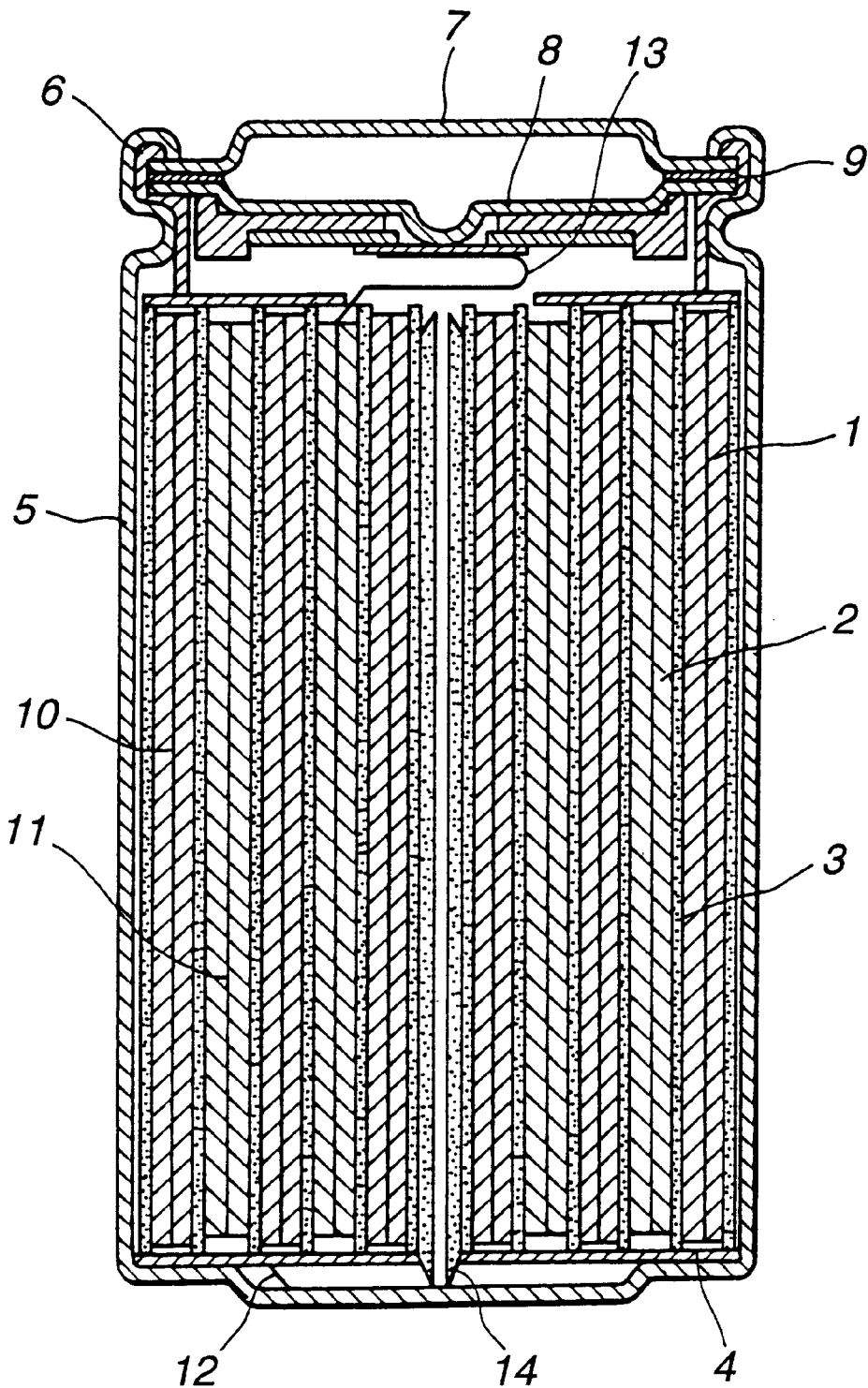
FIG. 3 is a longitudinal cross section showing a structural example of a non-aqueous electrolyte secondary cell according to the present invention.

A structure of a cell made in each Example as below mentioned is shown in FIG. 3.

This non-aqueous electrolyte secondary cell, as shown in FIG. 3, is put in a cell can 5 under the condition that a negative electrode 1, including a negative electrode active material applied to a current collecting body 10 of the negative electrode, and a positive electrode 2, including a positive electrode active material applied to a current collecting body 11 of the positive electrode, are wound through a separator 3 and insulators 4 are installed on the upper and the lower part of the wound body.

A cell cap 7 is installed by being held through a sealing gasket 6 on the cell can 5 as above mentioned. They are electrically connected through the negative lead 12 and the positive lead 13, with the negative electrode 1 or the positive electrode 2 respectively, and are formed to function as the negative and the positive electrode of the cell.

In the cell according to the present invention, the positive electrode lead 13 is welded to a thin plate 8 for shielding an electric current, and is connected electrically through the thin plate 8 for shielding the electric current and a heat sensitive resistance element (PTC element) 9 with the cell cap 7.

In the cell having the structure as above mentioned, when pressure in the cell is up, the thin plate 8 for shielding the electric current is pushed up and deformed. Then, the positive electrode lead 13 is cut except a part welded to the thin plate 8 for shielding the electric current, and the electric current is shielded.

Example 1

First, negative electrode active material was manufactured as follows.

30 parts by weight of coal tar class pitch, which was a binder, was added to 100 parts by weight of coal class coke, which was filler. After mixing them at the temperature of about 100° C., a precursor of a molded body of carbon was obtained by compression molding by a press.

Next, the molded body of carbon material was made by performing thermal treatment on the precursor at a temperature lower than 1000° C. The pitch impregnating/calcinating process, where binder pitch melted at the temperature lower than 200° C. was impregnated to the molded body of the carbon material and thermal treatment was performed at the temperature lower than 1000° C., was repeatedly performed.

After that, a graphitized molded body was made by performing the thermal treatment on the molded body of carbon at the temperature 2700° C. under an inactive atmosphere to the molded body of carbon. Graphite sample powder is made by crushing and classifying it.

Material values of the graphite material obtained then are shown as follows.

Surface Interval of (002) Surface: 0.337 nm
Thickness of Crystallite in the Direction of C Axis of (002) Surface: 50.0 nm
Actual Density: 2.23 g/cm³
Volume Density: 0.83 g/cm³
Mean Form Parameter×ave: 10
Specific Surface Area: 4.4 m²/g
Degree of Grain:
   Mean Grain Size: 31.2 μm
   Accumulation 10 grain size %: 12.3 μm
   Accumulation 50 grain size %: 29.5 μm
   Accumulation 90 grain size %: 53.7 μm
   Mean Value of Destructive Strength of Grain: 7.1 kgf/mm²

The surface interval of the (002) surface of the thickness of the crystallite in the direction of the C Axis of the (002) surface were measured by an X-ray diffraction measuring method. The actual density was measured by the picnometer method. The specific area was measured by the BET method, and the degree of grains were measured by the distribution of the grain sizes by the laser diffraction method.

A negative electrode 1 is made when the graphite sample powder obtained as above mentioned acts as the negative electrode active material.

First, the negative electrode binding agent was prepared by mixing 90 parts by weight of the graphite sample powder with 10 parts by weight of polyvinyliden fluoride (PVDF) as a binding agent. The negative electrode binding agent slurry (paste) was prepared by dispersing it with N-methylpyrrolidone, which was a solvent.

Next, a belt type cupper film which was 10 μm thick, was prepared as a negative electrode current collecting body 10. After uniformly applying and drying the negative electrode binding agent slurry, as above mentioned, on both surfaces of the negative electrode current collecting body 10, the belt type negative electrode 1 was made by compression molding at the fixed pressure.

The positive electrode active material was made as follows.

0.5 mol of Lithium carbonate was mixed with 1 mol of cobalt carbonate. The mixture of them was calcinated in air at a temperature of 900° C. for five hours. X-ray diffraction measuring was executed to the obtained material. A result was properly measured with the peak of $LiCoO_2$ registered in the JCPDS file.

By crushing $LiCoO_2$, powder of $LiCoO_2$, where accumulation 50 grain size % obtained by the laser diffraction method was 15 μm was obtained.

Further, 95 parts by weight of $LiCoO_2$, powder was mixed with 5 parts by weight of Lithium carbonate powder. The positive electrode binding agent-was prepared by mixing 91 parts by weight of them with 6 parts by weight of scaly graphite as conductive agent with 3 parts by weight of polyvinyliden fluoride as the binder. The positive electrode binding agent slurry (paste) was prepared by dispersing it with N-methylpyrrolidone.

Next, a belt type copper film which was 20 μm thick, was prepared as a positive electrode current collecting body 11. After uniformly applying the positive electrode binding agent slurry as above mentioned on both surfaces of the positive electrode current collecting body 11 and drying it, the belt type positive electrode 2 was made by compression molding.

The belt type negative electrode 1 and the belt type positive electrode 2 made as above mentioned, as shown in FIG. 3, were wound many times after accumulating the negative electrode 1, a separator 3, the positive electrode 2 and separator 3, in order, through the separators which are formed by polypropylene film having many minute holes, which were 25 μm thick, as shown in FIG. 3. A spiral electrode body the outer diameter of which was 18 mm, was made.

The spiral electrode body made as above mentioned was put in a cell can 5 made by iron plated with nickel.

An insulating plate 4 is installed on both the upper and the lower surface of the spiral electrode. A positive electrode lead 13 made of aluminum was protruded from the positive electrode electric current collecting body 11 and welded to the thin plate for shielding the electric current. A negative electrode lead 12 made of aluminum was protruded from the negative electrode electric current collecting body 10 and welded to the cell can 5.

Electrolyte was prepared by adding a monomethoxy benzene class compound to the solvent, including ethylene carbonate, and dimethyl carbonate in equal volume at the concentration of 0.05 M, and by dissolving $LiPF_6$ at the concentration of 1 mol/l. Then, the electrolyte was poured into the cell can 5. And, then a center pin 14 was inserted into the central portion of the electrode element. The monomethoxy benzene class compound used here is generally represented by Chemical Formula 4.

[Chemical Formula 4]

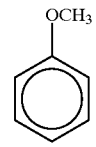

Next, by holding the cell can 5 through the shielded sealing gasket 6, the surface of which asphalt was applied, a safety valve apparatus 8 having a current shielding mechanism, PTC element 9 and the cell cap 7 were fixed. Air tightness was maintained in the cell and a cylindrical non-aqueous electrolyte secondary cell, the diameter of which was 18 mm and which was 65 mm high was formed.

Examples 2 through 9

A non-aqueous electrolyte secondary cell was made similar to Example 1 except that the compound shown in Chemical Formulas 5 through 12 as the monomethoxy benzene class compounds were added to the electrolyte.

[Chemical Formula 5]

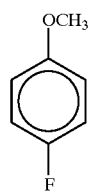

[Chemical Formula 6]

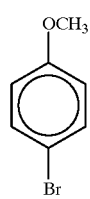

[Chemical Formula 7]

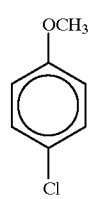

[Chemical Formula 8]

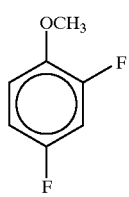

[Chemical Formula 9]

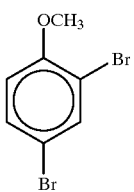

[Chemical Formula 10]

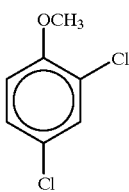

[Chemical Formula 11]

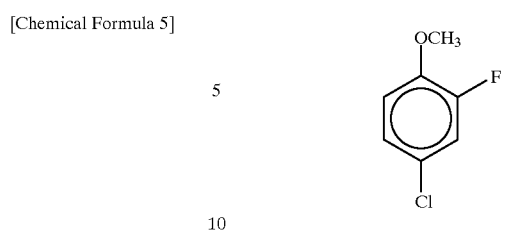

[Chemical Formula 12]

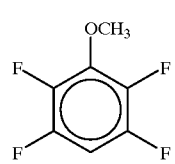

Comparative Example 1

A non-aqueous electrolyte secondary cell was made similar to Example 1 except monomethoxy benzene class compounds were not added to the electrolyte.

Charging/discharging efficiency and capacity maintenance factor before and after preserving were measured by charging and discharging the cell made as above mentioned.

Charging and discharging was executed under the conditions of discharging to the stop voltage of 2.75 V by the fixed current 0.5 A. This was done after charging for 4 hours at the constant electronic current 0.5 A and the maximum voltage 4.2V.

The cell was preserved at 23° C. for one month to measure the capacity maintenance factor.

The charging/discharging efficiency and the capacity maintenance factor were found according to the following expressions.

Charging/Discharging Efficiency (%)=(Discharged Capacity/Charged Capacity)×100

Capacity Maintenance Factor (%)=(Capacity After Preserving/Capacity Before Preserving)×100

The measured charged capacity, the charging/discharging efficiency and the capacity maintenance factor are shown in Table 1.

TABLE 1

|  | Additional Compounds | Addition (M) |
|---|---|---|
| Example 1 | Chemical Formula 4 | 0.05 |
| Example 2 | Chemical Formula 5 | 0.05 |
| Example 3 | Chemical Formula 6 | 0.05 |
| Example 4 | Chemical Formula 7 | 0.05 |
| Example 5 | Chemical Formula 8 | 0.05 |
| Example 6 | Chemical Formula 9 | 0.05 |
| Example 7 | Chemical Formula 10 | 0.05 |
| Example 8 | Chemical Formula 11 | 0.05 |

TABLE 1-continued

| | | |
|---|---|---|
| Example 9 | Chemical Formula 12 | 0.05 |
| Comparative Example 1 | Nothing | 0 |

| | Before preserving for one month at 23° C. | | Capacity Maintenance Factor |
|---|---|---|---|
| | Capacity (mAh) | Charging/ discharging Efficiency (%) | After preserving for one month at 23° C. (%) |
| Example 1 | 1527 | 89 | 92 |
| Example 2 | 1532 | 90 | 94 |
| Example 3 | 1530 | 88 | 92 |
| Example 4 | 1533 | 90 | 93 |
| Example 5 | 1526 | 89 | 92 |
| Example 6 | 1528 | 88 | 92 |
| Example 7 | 1531 | 90 | 93 |
| Example 8 | 1527 | 89 | 92 |
| Example 9 | 1534 | 91 | 94 |
| Comparative Example 1 | 1510 | 86 | 88 |

As shown in Table 1, in any of the cells in Examples 1 through 9 where the monomethoxy benzene class compounds were added to the electrolyte, the capacity, the charging/discharging efficiency and the capacity maintenance factor are larger than those of the cell in Comparative Example 1 where the monomethoxy benzene class compounds were not added to the electrolyte.

Therefore, it is understood that when the monomethoxy benzene class compounds are added to the electrolyte, performance of the cell is improved. The inventors consider the monomethoxy benzene class compounds added to the electrolyte have an effect on preventing irreversible reaction of the electrode caused during charging.

Examination of Addition of Monomethoxy benzene Class Compounds

A non-aqueous electrolyte secondary cell was made similar to Example 1 except by using the compounds as shown in Chemical Formulas 4, 5 or 8 as the monomethoxy benzene class compounds for the electrolyte and changing the addition as shown in Table 2 (Experimental Examples 1 through 17).

Figure 4:
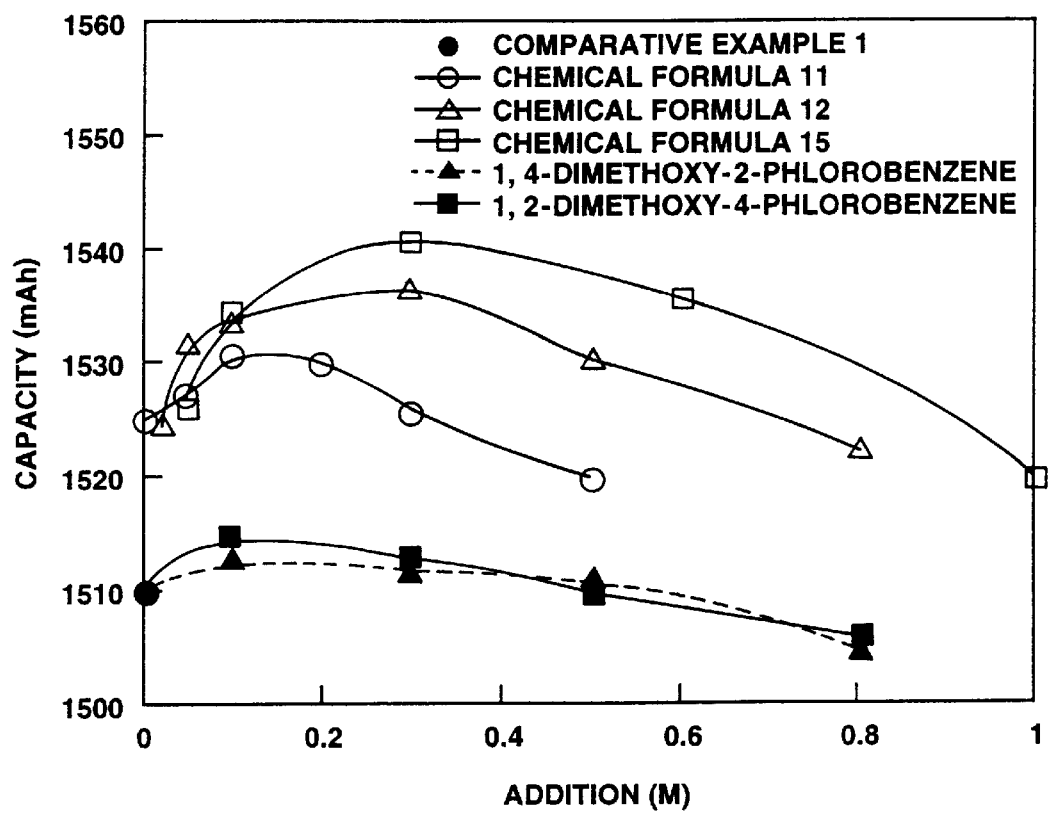
FIG. 4 is a characteristic view showing relation between addition and capacity of monomethoxy benzene class compounds.
Figure 5:
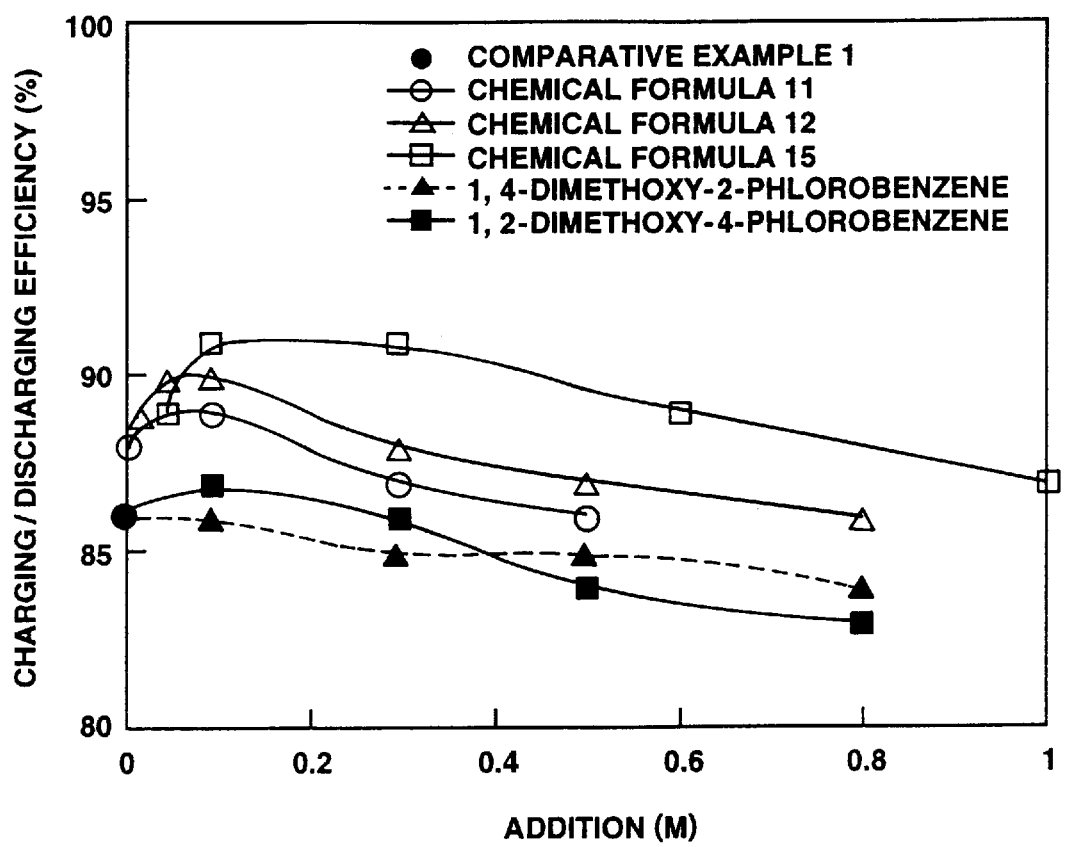
FIG. 5 is a characteristic view showing relation between addition and charging/discharging efficiency of monomethoxy benzene class compounds.
Figure 6:
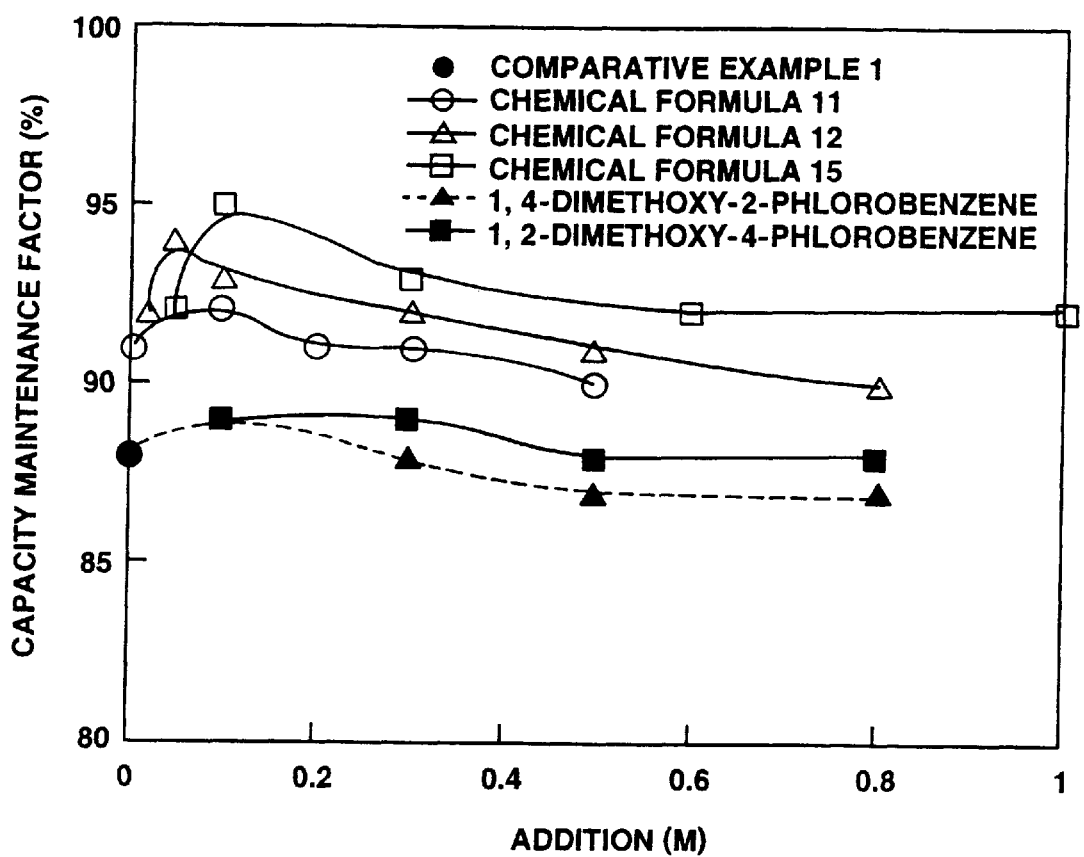
FIG. 6 is a characteristic view showing relation between addition and maintenance factor of monomethoxy benzene class compounds.

The capacity, the charging/discharging efficiency and the capacity maintenance factor of the cell made as above mentioned were similarly measured. The results are shown in Table 2 with the kinds and the addition of the monomethoxy benzene class compounds identified. Further, the relation between the addition and capacity of these compounds is shown in FIG. 4, the relation between the addition and the charging/discharging efficiency is shown in FIG. 5 and the relation between the addition and the capacity maintenance factor is shown in FIG. 6.

In order to compare, a non-aqueous electrolyte secondary cell was made by using 1,2-dimethoxy-4-phlorovenzene or 1,4-dimethoxy-2-phlorovenzene except monomethoxy benzene (Comparative Experimental Examples 1 through 8). The capacity, the charging/discharging efficiency and the capacity maintenance factor were measured. The results are shown with the addition of the compounds in Table 2. Further, the relation between the addition and the capacity of these compounds is shown in FIG. 4, the relation between the addition and the charging/discharging efficiency of the compounds is shown in FIG. 5 and the relation between the addition and the capacity maintenance factor of the compounds is shown in FIG. 6.

TABLE 2

| | Additional Compounds | Addition (M) |
|---|---|---|
| Experimental Example 1 | Chemical Formula 4 | 0.005 |
| Experimental Example 2 | Chemical Formula 4 | 0.05 |
| Experimental Example 3 | Chemical Formula 4 | 0.10 |
| Experimental Example 4 | Chemical Formula 4 | 0.20 |
| Experimental Example 5 | Chemical Formula 4 | 0.30 |
| Experimental Example 6 | Chemical Formula 4 | 0.50 |
| Experimental Example 7 | Chemical Formula 5 | 0.02 |
| Experimental Example 8 | Chemical Formula 5 | 0.05 |
| Experimental Example 9 | Chemical Formula 5 | 0.10 |
| Experimental Example 10 | Chemical Formula 5 | 0.30 |
| Experimental Example 11 | Chemical Formula 5 | 0.50 |
| Experimental Example 12 | Chemical Formula 5 | 0.80 |
| Experimental Example 13 | Chemical Formula 8 | 0.05 |
| Experimental Example 14 | Chemical Formula 8 | 0.10 |
| Experimental Example 15 | Chemical Formula 8 | 0.30 |
| Experimental Example 16 | Chemical Formula 8 | 0.60 |
| Experimental Example 17 | Chemical Formula 8 | 1.00 |
| Experimental Comparative Example 1 | 1, 2-dimethoxy-4-fluorobenzene | 0.1 |
| Experimental Comparative Example 2 | 1, 2-dimethoxy-4-fluorobenzene | 0.3 |
| Experimental Comparative Example 3 | 1, 2-dimethoxy-4-fluorobenzene | 0.5 |
| Experimental Comparative Example 4 | 1, 2-dimethoxy-4-fluorobenzene | 0.8 |
| Experimental Comparative Example 5 | 1, 4-dimethoxy-2-fluorobenzene | 0.1 |
| Experimental Comparative Example 6 | 1, 4-dimethoxy-2-fluorobenzene | 0.3 |
| Experimental Comparative Example 7 | 1, 4-dimethoxy-2-fluorobenzene | 0.5 |
| Experimental Comparative Example 8 | 1, 4-dimethoxy-2-fluorobenzene | 0.8 |

| | Before preserving for one month at 23° C. | | Capacity Maintenance Factor |
|---|---|---|---|
| | Capacity (mAh) | Charging/ discharging Efficiency (%) | After preserving for one month at 23° C. (%) |
| Experimental Example 1 | 1525 | 88 | 91 |
| Experimental Example 2 | 1527 | 89 | 92 |
| Experimental Example 3 | 1531 | 89 | 92 |

TABLE 2-continued

| | | | |
|---|---|---|---|
| Experimental Example 4 | 1530 | 88 | 91 |
| Experimental Example 5 | 1526 | 87 | 91 |
| Experimental Example 6 | 1520 | 86 | 90 |
| Experimental Example 7 | 1525 | 89 | 92 |
| Experimental Example 8 | 1532 | 90 | 94 |
| Experimental Example 9 | 1534 | 90 | 93 |
| Experimental Example 10 | 1537 | 88 | 93 |
| Experimental Example 11 | 1531 | 87 | 91 |
| Experimental Example 12 | 1523 | 86 | 90 |
| Experimental Example 13 | 1526 | 89 | 92 |
| Experimental Example 14 | 1535 | 91 | 95 |
| Experimental Example 15 | 1541 | 91 | 93 |
| Experimental Example 16 | 1526 | 89 | 92 |
| Experimental Example 17 | 1520 | 87 | 92 |
| Experimental Comparative Example 1 | 1515 | 87 | 89 |
| Experimental Comparative Example 2 | 1513 | 86 | 89 |
| Experimental Comparative Example 3 | 1510 | 84 | 88 |
| Experimental Comparative Example 4 | 1506 | 83 | 88 |
| Experimental Comparative Example 5 | 1513 | 86 | 89 |
| Experimental Comparative Example 6 | 1512 | 85 | 88 |
| Experimental Comparative Example 7 | 1511 | 85 | 87 |
| Experimental Comparative Example 8 | 1505 | 84 | 87 |

Seeing the case of adding the monomethoxy benzene class compounds to the electrolyte in FIG. 4 through 6, it is understood that the characteristic values are changed depending on the addition. That is, these characteristic values are increased depending on increasing of the addition up to some value and are decreased depending on increasing of the addition after some value.

When the addition of the monomethoxy benzene class compounds is within the range from 0.005 to 0.9 M, more preferably, from 0.005 to 0.5 M, it is possible to obtain the superior characteristic compared with when the monomethoxy benzene class compounds are not added. Thus, it is understood that the addition of the monomethoxy benzene class compounds may be within the range from 0.005 to 0.9 M, more preferably, from 0.005 to 0.5 M.

Here, for comparison purposes, the characteristic of the case when 1,2-dimethoxy-4-fluorobenzene or 1,4-dimethoxy-2-fluorobenzene is added to the electrolyte was also evaluated. In this case, though the characteristic is barely advanced by adding a very small amount of these compounds, the characteristic is degraded rather than before.

Therefore, it is understood that 1,2-dimethoxy-4-fluorobenzene or 1,4-dimethoxy-2-fluorobenzene are not suitable for adding to the electrolyte.

What is claimed is:

1. A non-aqueous electrolyte secondary cell comprising:
a negative electrode that is capable of doping/dedoping lithium,
a positive electrode and
a non-aqueous electrolyte dissolved in a non-aqueous solvent, wherein a monomethoxy benzene or a monomethoxy benzene class compound is added to said non-aqueous electrolyte at a concentration ranging from 0.005 M to 0.5 M, said monomethoxy benzene class compound is selected from the group of a compound represented by Chemical Formula 1, 2 and 3:

[Chemical Formula 1]

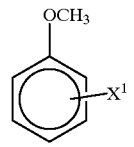

Where, $X^1$ is a halogen element,

[Chemical Formula 2]

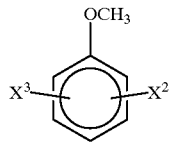

Where, $X^2$ and $X^3$ are halogen elements,

[Chemical Formula 3]

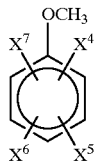

Where, $X^4$, $X^5$, $X^6$ and $X^7$ are halogen elements.

2. A non-aqueous electrolyte secondary cell according to claim 1, wherein said positive electrode comprises a lithium transition metal oxide compound represented by $LiMO_2$, where M is at least one of Co, Ni, Mn, Fe, Al, V and Ti.

3. A non-aqueous electrolyte secondary cell according to claim 1, wherein said negative electrode comprises a carbon material.

4. A non-aqueous electrolyte secondary cell according to claim 3, wherein said carbon material is graphite material or non-graphitizable carbon material.

5. A non-aqueous electrolyte secondary cell according to claim 4, wherein said graphite material has an actual density of more than 2.1 g/cm$^3$, a surface interval of (002) surface from 0.335 to 0.337 nm, and a thickness of crystallite in the direction of C axis of (002) surface of more than 14.0 nm.

6. A non-aqueous electrolyte secondary cell according to claim 4, wherein said non-graphitizable carbon material has a surface interval of (002) surface of more than 0.37 nm, an actual density of less than 1.70 g/cm$^3$ and does not have a peak for generating heat higher than 700° C. in differential thermal analysis in a current of air.

7. A non-aqueous electrolyte secondary cell according to claim 1, wherein said negative electrode comprises crystalline or non-crystalline metallic chalcognide.

8. A non-aqueous electrolyte secondary cell according to claim 1, wherein said electrolyte dissolves lithium salt in non-aqueous solvents comprising at least either a high permitivity solvent or a low viscosity solvent.

9. A non-aqueous electrolyte secondary cell according to claim 8, wherein said high permitivity solvent is a compound selected from the group consisting of ethylene carbonate, propylene carbonate, butylene carbonate, vinylene carbonate, suforane acid, butyrolactone acid and valerolactone acid.

10. A non-aqueous electrolyte secondary cell according to claim 8, wherein said low viscosity solvent is a compound selected from the group consisting of diethyl carbonate, dimethyl carbonate, ethyl-methyl carbonate, methyl propyl carbonate, methyl propionate, ethyl propionate, trimethyl phosphate, and triethyl phosphate.

* * * * *